Aug. 2, 1960  C. W. TAYLOR, JR  2,947,032
APPARATUS FOR PROCESSING EXTRUDED PLASTIC TUBE
Filed May 21, 1958  2 Sheets-Sheet 1

INVENTOR.
CHARLES W. TAYLOR, JR.
BY
*R. L. Miller*
ATTORNEY

INVENTOR.
CHARLES W. TAYLOR, JR.
BY
ATTORNEY

United States Patent Office 2,947,032
Patented Aug. 2, 1960

2,947,032

APPARATUS FOR PROCESSING EXTRUDED PLASTIC TUBE

Charles W. Taylor, Jr., Akron, Ohio, assignor to The Goodyear Tire & Rubber Company, Akron, Ohio, a corporation of Ohio Filed May 21, 1958, Ser. No. 736,906

6 Claims. (Cl. 18—14)

This invention relates to extrusion of plastic material and more particularly to an apparatus for subsequently sizing and quenching plastic material extruded in the form of a tube.

One form of an apparatus to accomplish this is shown in the United States patent application Serial No. 716,775, filed February 21, 1958, of which I am one of the co-inventors.

Products of many of the modern thermoplastic materials are formed by extruding in one form or another. One substantial use of the extrusion process is in the manufacture of film in which the plastic material is extruded in the form of a thin-walled tube which is subsequently expanded by means of a pressure gas bubble confined in the tube as it leaves the extruding die. The pressure of the gas bubble causes the tube to expand, thus reduces the gauge or the thickness of the tube wall and ultimately increases the width of the film obtained from the tube. Subsequently, if desired, the tube may or may not be further stretched mechanically before slitting the tube thus forming film of the plastic material.

It is apparent that a better control of film gauge and width may be had if the extruded tube size is accurately controlled and the film set or quenched at the desired size. With some plastic materials it is necessary and desirable that a substantial length of the extruded tube be subjected continuously to the sizing and quenching operation if uniform and accurate results are to be obtained. If this is done, many of the materials have a tendency to stick to the apparatus while passing therethrough. This results in considerable waste of material, great quantities of defective film and inefficient operation of the equipment. It is therefore an object of this invention to provide an apparatus for accurately sizing a tube of plastic material.

Another object of this invention is to provide an apparatus in which the temperature may be accurately and adjustably controlled for different plastic materials.

A further object of the invention is to provide an apparatus which will permit the tube to pass therethrough without sticking to the apparatus and simultaneously maintain a uniform temperature throughout.

A still further object of this invention is to provide an apparatus for use with an extruding operation that may be adjusted to a wide variety of conditions.

Another object of the invention is to provide a relatively simple and economical apparatus.

Other objects of this invention will appear hereinafter as the description thereof proceeds, the novel features, arrangements and combinations being clearly pointed out in the claims hereunto appended.

Figure 1:
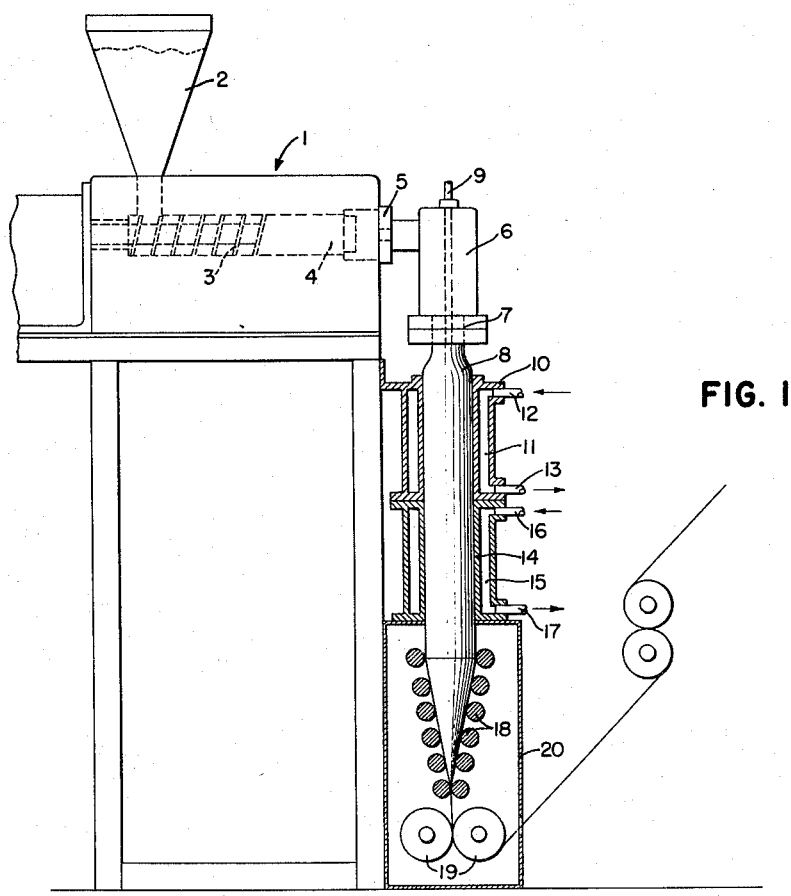
Fig. 1 is a diagrammatic sketch of a typical extrusion apparatus including one form of the apparatus of the invention.

In Fig. 1 a typical extrusion apparatus 1 for use with plastic material in the form of granular particles, includes a hopper 2 into which the particles are placed. The particular extrusion apparatus used with this invention may be of any of the well known types and the particular type used will depend upon the plastic material that is to be extruded. They are advanced from the hopper 2 by the worm screw 3 into the barrel 4 which may be heated to the desired temperature for satisfactory processing of the material. On the end of barrel 4 is a filter 5 through which the material after compressing and fusing in the barrel 4 advances into the extrusion head 6 and thence out through die 7 to form the tube 8. Air or other gas under low pressure not to exceed 3 lbs. per square inch is introduced into the tube through a channel 9 in the die 7.

The tube expands under the pressure of the gas and as it is advanced the expansion is limited to the diameter of the quench and sizing tube 10. The interior surface of the tube 10 is cooled, for example, to 75° F. by means of cooling fluid circulating through the shell 11. For example, the fluid enters the shell 11 through the inlet opening 12 and out through the outlet opening 13. The film tube 8 is thus cooled to substantially the temperature of the tube wall and simultaneously sized to the diameter of the tube. During this quenching and sizing operation the film tube is continuously advancing through the cooling tube 10 and thence into a heating tube 14 which is maintained at a temperature of 180° F. The tube 14 is heated by circulating heating fluid through the shell 15 which enters through the inlet opening 16 and out through the outlet opening 17.

In the particular form of the apparatus shown in Fig. 1 which is representative only, the tube 8 advances from the heating tube 14 to the collapsing rolls 18 which are progressively more closely spaced until the last pair of rolls completely flatten the tube. It then passes through a pair of compression or pinch rolls 19 onto the wind-up rolls not shown. As illustrated, the collapsing rolls 18 and pinch rolls 19 are enclosed in a heated oven 20 to maintain the film at the desired temperature which may be higher than the glass temperature of the plastic material but below the "blocking" or sticking temperature of the film, that is, the temperature at which the film surfaces stick to each other.

The previously mentioned temperatures for the tubes 10 annd 14 are only representative for one particular plastic resin composition. The temperatures may be maintained at the proper temperatures for the best processing of any plastic resin composition by circulating the fluid through the tube jackets from a controlled temperature source of fluid. The temperatures in any instance, are lower than that of the film as it leaves the extruder so that the extruded tube is quenched relative to the extruded conditions.

When extruding films of crystallizable plastic resin materials which have a rapid rate of crystallization, it is necessary to quickly quench the extruded tube to a temperature well below the minimum crystallization temperature of the resin of which the film is made in order to prevent crystallization of the resin and to obtain a completely amorphous film. In this case it may be necessary to re-heat the film to a temperature above the glass temperature of the resin of which the film is made so that it may be collapsed or subjected to further processing operations. The film, of course, would be heated to a temperature somewhat below the minimum crystallization temperature and preferably also below the blocking or sticking temperature of the film. When extruding such materials, the tube 10 is maintained at a very low temperature in order to give rapid quenching to the extruded film tube and the tube 14 is maintained at a somewhat higher temperature which is above the glass temperature of the particular plastic resin material being extruded. The temperatures of the tubes 10 and 14 are regulated according to the thickness of the film tube being extruded, and the crystallization temperature, and glass temperature of the resin being extruded.

It is not necessary in the extrusion of many of the plastic resin materials to quickly substantially reduce the temperature of the extruded tube below the crystallizing temperature in accordance with the foregoing description.

If the particular material does not necessitate the rapid quench, the tubes 10 and 14 may be maintained at similar temperatures if desired so as to cool the film below the blocking temperature but still be formable. It is apparent that almost any desired combination of temperatures may be provided with this apparatus and it has been found that a range of 60° F to 200° F. will be sufficient for substantially all of the presently known materials.

Figure 2:
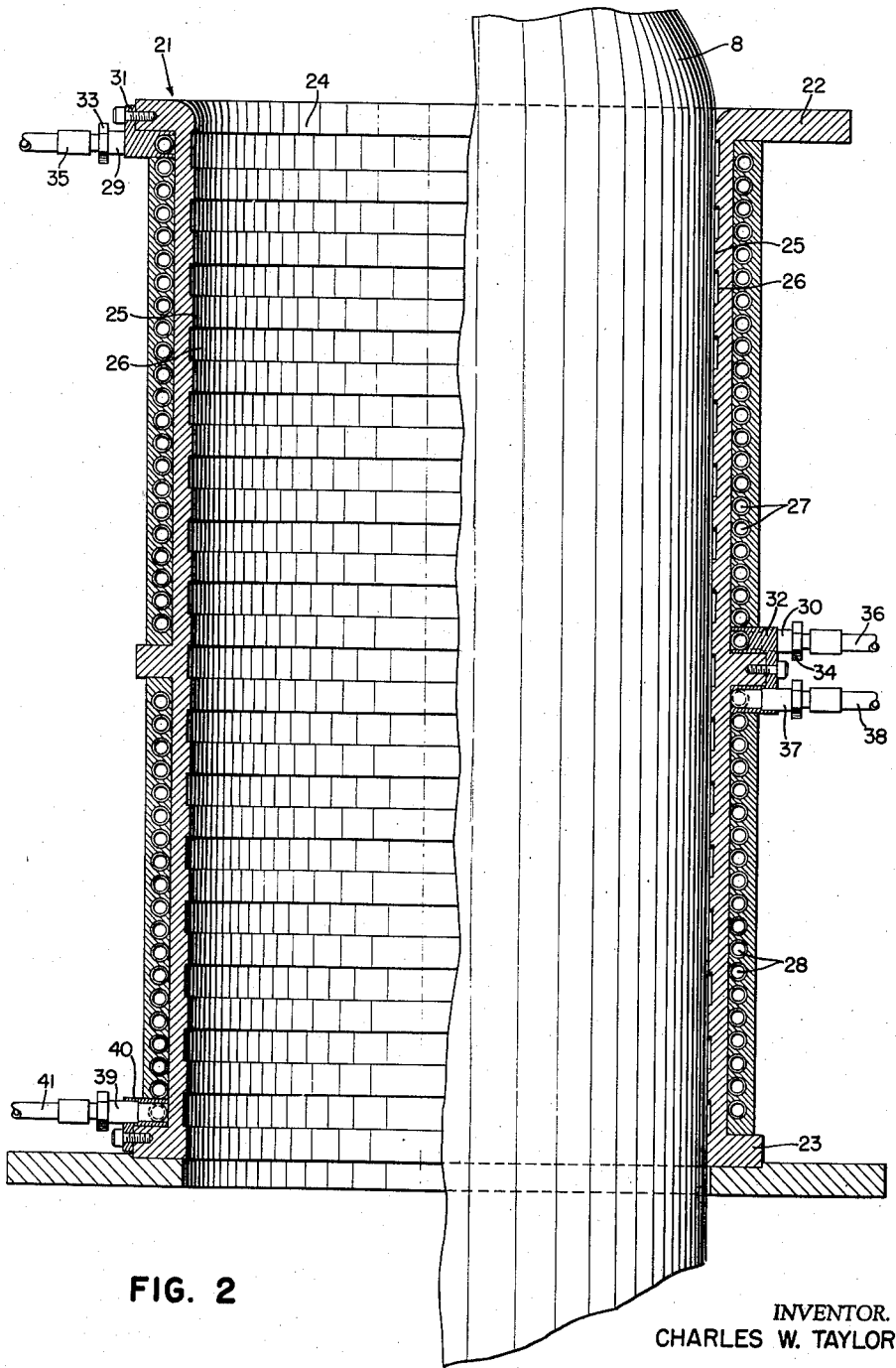
Fig. 2 is a sectional view of one form of the invention.

In Fig. 2, the size and quench tube 21 is a tubular element with flange ends 22 and 23 for convenience in mounting with respect to the extrusion apparatus. The interior surface 24 of the size and quench tube 21 is formed of an alternating series of lands 25 and recesses 26. The diameter of the lands 25 are substantially the diameter of the finished tube of plastic material with the recesses 26 between the lands 25 being of slightly greater diameter. The alternating series of lands 25 and recesses 26 extends throughout the entire length of the interior of the tube 24. As shown, the lands 25 and recesses 26 are of substantially equal extent but considerable variations in the proportions may be made without materially affecting the operation of the tube.

As shown, a pair of temperature controlling means 27 and 28 surround the exterior of the tube 24. Each of the temperature control means 27 and 28, comprise a closely spaced coil of tubing such as copper surrounding the exterior of the tube 24 so that the temperature liquid, such as water, circulating through the coil 27 or 28 will maintain the temperature of the interior surface of the sleeve 24 at the predetermined temperature. As shown, the coils 27 and 28 are embedded in and covered by a thermoconductive cement to provide for more efficient operation and an insulating jacket (not shown) may be placed around the entire assembly for more efficient operation. The end portions 29 and 30 of the coil 27 are clamped to the sleeve by clamps 31 and 32 respectively. Connectors 33 and 34 are attached respectively to the ends 29 and 30 to which a connecting water line is attached. As shown, a water line 35 is attached through which water heated to the desired temperature enters the coil 27 and circulates therethrough and passes out through line 26 attached to coupling 34.

In a similar manner, the end 37 of coil 28 is attached by clamp 32 to the outside of the sleeve 24 and has attached thereto a water line 38 through which the water enters the coil 28. The other end of coil 39 is attached by clamp 40 and joined to the water line 41. Water circulating through coil 28 preferably is from a different source than that which circulates through coil 27 so that the temperature of the water in each coil will control independently the temperature of a different portion of the tube.

Figure 3:
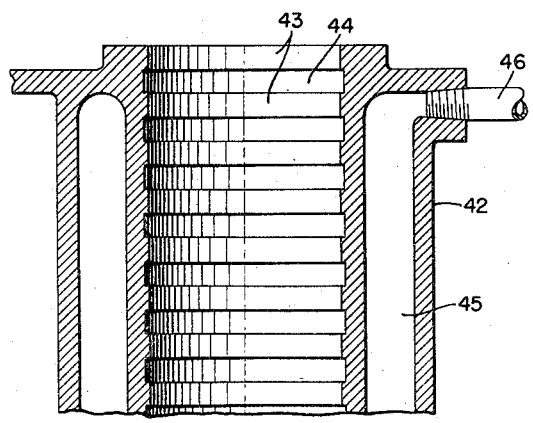
Fig. 3 is a fragmentary section of another form of the invention.

In Fig. 3 a modified form of the quench and size tube 42 is shown in which the tube 42 is hollow walled. The interior surface of the tube is formed of an alternating series of lands 43 and 44 as previously described for the tube illustrated in Fig. 2. A heated liquid such as water enters the chamber 45 through the inlet 46 and is circulated through the chamber and exits through an outlet, not shown, at the bottom. In order to provide for different temperatures that are required at times in different portions of the size and quench tube, a second tube is mounted in tandem or alignment with the first tube as seen in Fig. 1. The extruded plastic tube passes successively through each tube. By this arrangement an almost unlimited combination of temperature conditions may be maintained in accordance with the specific requirements of different materials.

In the operation of either form of the apparatus shown, the extruded tube is expanded by the confined gas bubble to substantially the diameter of the interior of the tube. The surface temperatures maintained in the tubes are in any instance below that of the film as it leaves the extruding die so that the plastic tube is quenched as it passes through the tube. By the quenching in the tubes, the plastic tube is "set" at the desired size and simultaneously a uniform temperature is established throughout the length of the plastic tube.

The tube passes through the size and quench tube with no drag or sticking. The tube floats on a very thin film of air between the lands and the surface of the tube provided by the air pocketed in the recesses. The air film is created by the motion of the plastic tube through the quench and size tube continuously drawing out a portion of the air in the pocket and compressing it between the lands and plastic tube. This very thin film of air prevents the contact between the film and tube. With proper selection of temperature, the tube is processed readily and is of uniform size and temperature.

While the apparatus is applicable for the quenching and sizing of extruded film tubes of organic film forming compositions such as ethylene polymers, vinyl polymers and polystyrene, it is particularly adapted for the quenching and sizing of extruded film tubes of high molecular weight linear condensation polymers such as polyamides, polyesters, and mixed polyester-polyamide compositions. The apparatus has been found to be particularly adapted for the quenching and sizing of tubes of linear aromatic polyesters such as polymeric ethylene terephthalate, ethylene terephthalate-ethylene isophthalate copolyesters, ethylene terephthalate-2,2-bis 4-(beta hydroxyethoxy) phenyl propane terephthalate copolyesters and other polyesters having high melting points. The apparatus can be used for the amorphous uncrystallizable polymers as well as for the high melting polymers having rapid crystallization rates.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to obtain by Letters Patent of the United States is:

1. Apparatus for sizing and quenching a tube of plastic material after exiting from an extrusion die comprising an elongated annular rigid member having the opening therethrough of a size substantially that of the sized tube, said member being spaced from and in substantial alignment with the die opening, a series of circumferentially continuous, axially spaced lands forming the interior surface of said member with the spaces between said lands being recessed radially outwardly, and temperature control means to maintain the temperature of said member at a predetermined temperature to cool said tube below the blocking temperature of the plastic material as it passes therethrough.

2. In a plastic extrusion apparatus having a die adapted to form a continuous tube of plastic material which subsequently is expanded to a larger diameter while still formable, the combination of means to size said tube to a predetermined diameter and simultaneously quench the sized tube to retain the diameter, comprising a sleeve positioned substantially in axial alignment with said die and spaced therefrom, a series of axially spaced, circumferentially continuous lands forming the interior surface of said sleeve, the diameter of said lands being substantially that of said predetermined tube diameter and means to maintain the temperature of the interior of said sleeve at a predetermined temperature to cool the extruded film by abstracting heat therefrom as it passes therethrough.

3. In a plastic extrusion apparatus having a die adapted to form a continuous tube of plastic material which subsequently is expanded to a larger diameter while still formable, the combination of means to size said tube to a predetermined diameter and simultaneously quench the sized tube to retain the diameter, comprising a sleeve positioned substantially in axial alignment with said die and spaced therefrom, a series of axially spaced, circumferentially continuous lands forming the interior surface of said sleeve, with the axial spacing between said lands being substantially equal to the axial extent of said lands, the diameter of said lands being substantially that of said predetermined tube diameter and means to maintain the temperature of the interior of said sleeve at a predetermined temperature to cool the extruded film by abstracting heat therefrom as it passes throughthrough.

4. In a plastic extrusion apparatus having a die adapted to form a tube of plastic material which subsequently is expanded to a larger diameter while still formable, the combination of means to size said tube to a predetermined diameter and simultaneously quench the sized tube to retain the diameter, comprising a hollow-walled sleeve positioned substantially in axial alignment with said die and spaced therefrom, a series of axially spaced circumferentially continuous lands forming the interior surface of said sleeve with the axial extent of the lands and the space therebetween being substantially equal, the diameter of said lands being substantially that of said predetermined tube diameter and the diameter of the sleeve between said lands being greater than that of said lands, inlet and outlet openings communicating with the interior of said sleeve, a source of a cooling medium connected to said inlet and outlet openings for circulation through the hollow wall to maintain the temperature at a predetermined temperature to cool the extruded film tube by abstracting heat therefrom as it is drawn through said sleeve.

5. In a plastic extrusion apparatus having a die adapted to form a tube of plastic material which subsequently is expanded to a larger diameter while still formable, the combination of means to seize said tube to a predetermined diameter and simultaneously quench the sized tube to retain the diameter, comprising a sleeve positioned substantially in axial alignment with said die and spaced therefrom, a series of axially spaced circumferentially continuous lands forming the interior surface of said sleeve, the diameter of said lands being substantially that of said predetermined tube diameter and the diameter of the sleeve between said lands being greater than that of said lands, a cooling coil adjacent the exterior of said sleeve, a source of a cooling medium connected to said cooling coil for circulation through the hollow wall to maintain the temperature at a predetermined temperature to cool the extruded plastic tube below the blocking temperature by abstracting heat therefrom as it is drawn through said sleeve.

6. Apparatus as claimed in claim 2 having a second sleeve arranged in tandem with the first sleeve, the temperature of said second sleeve being maintained at a temperature higher than that of said first sleeve but less than the blocking temperature of the extruded film to heat the film above the glass temperature.

References Cited in the file of this patent

UNITED STATES PATENTS

| | | |
|---|---|---|
| 2,519,375 | Jargstorff et al. | Aug. 22, 1950 |
| 2,708,772 | Moncrieff | May 24, 1955 |

UNITED STATES PATENT OFFICE
CERTIFICATE OF CORRECTION

Patent No. 2,947,032                                                 August 2, 1960

Charles W. Taylor, Jr.

It is hereby certified that error appears in the printed specification of the above numbered patent requiring correction and that the said Letters Patent should read as corrected below.

Column 2, line 49, for "annd" read -- and --; column 3, line 55, for "26" read -- 36 --; column 5, line 23, for "throughthrough" read -- therethrough --; column 6, line 11, for "seize" read -- size --.

Signed and sealed this 11th day of April 1961.

(SEAL)
Attest:
ERNEST W. SWIDER
Attesting Officer

ARTHUR W. CROCKER
                                                   Acting Commissioner of Patents